Dec. 31, 1929.  V. WAITKUS  1,741,387
COUNTING MECHANISM
Filed July 21, 1927  4 Sheets-Sheet 1
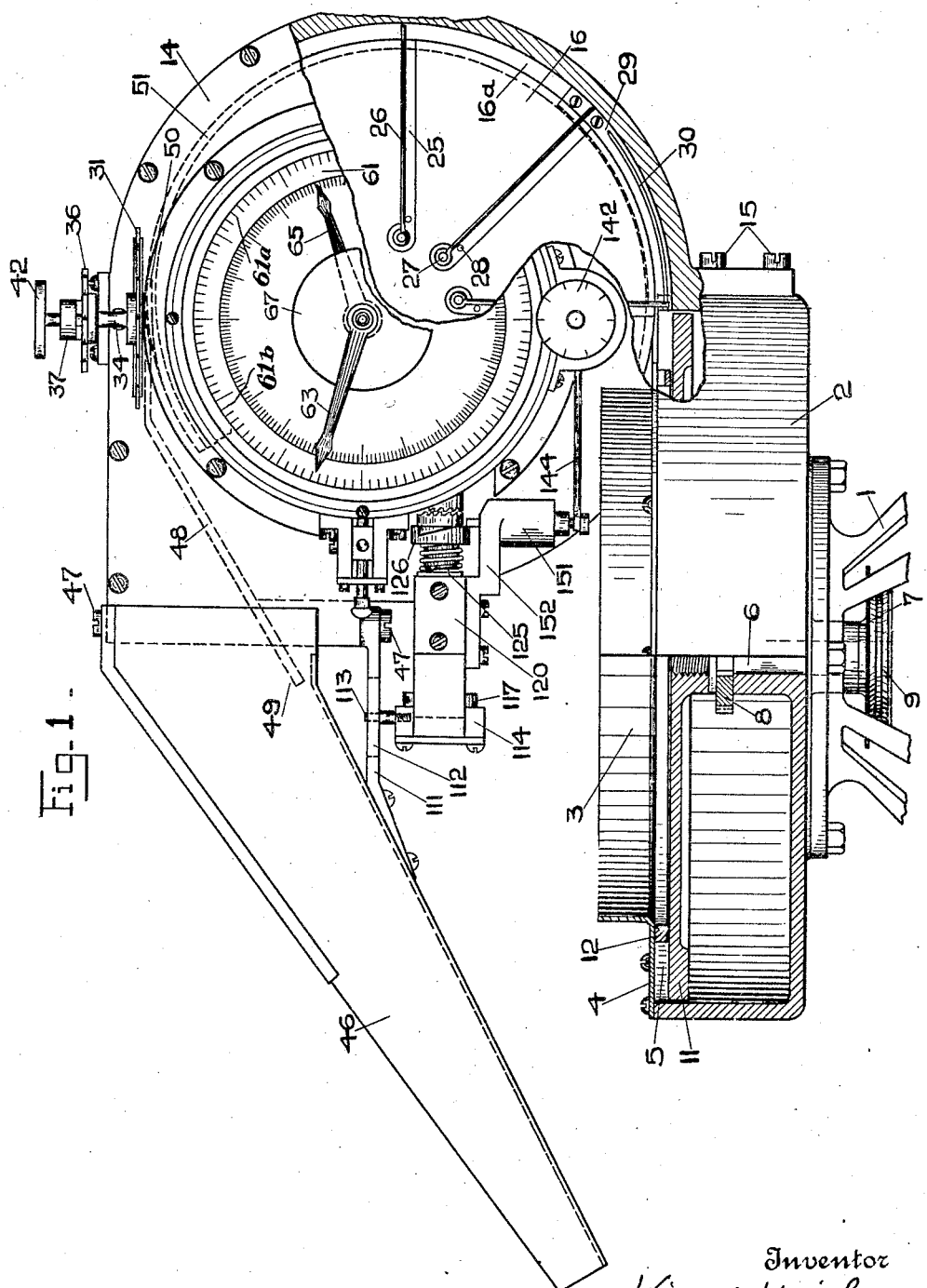

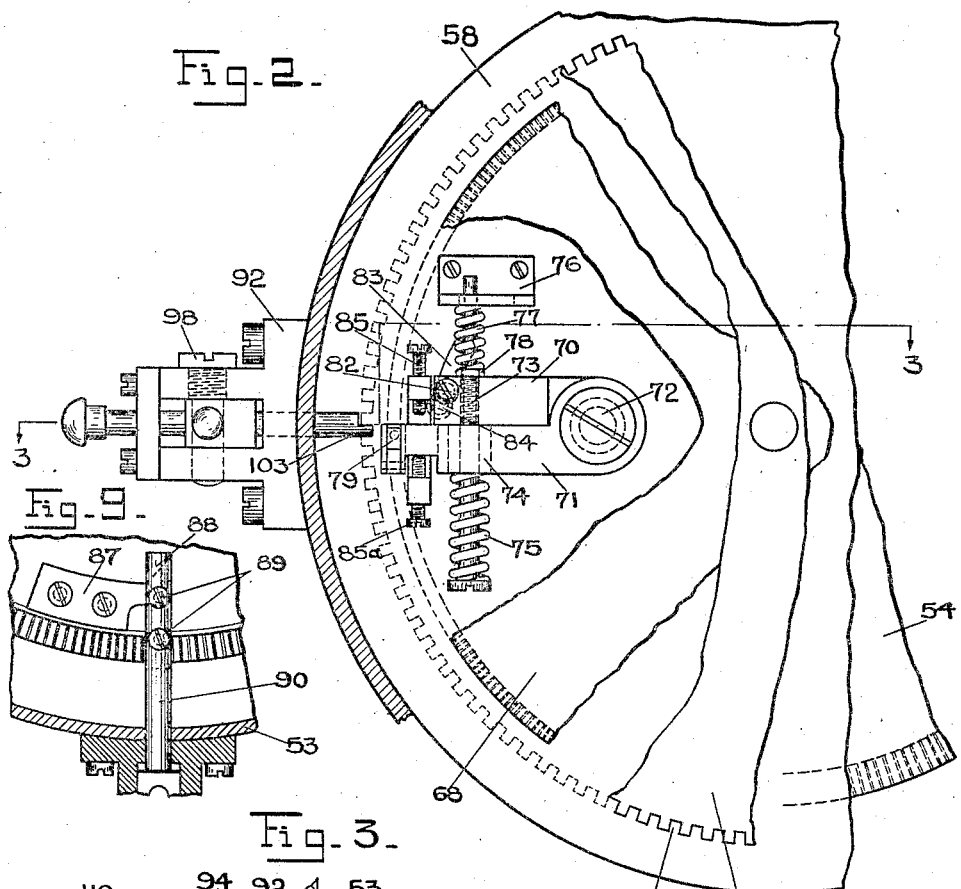
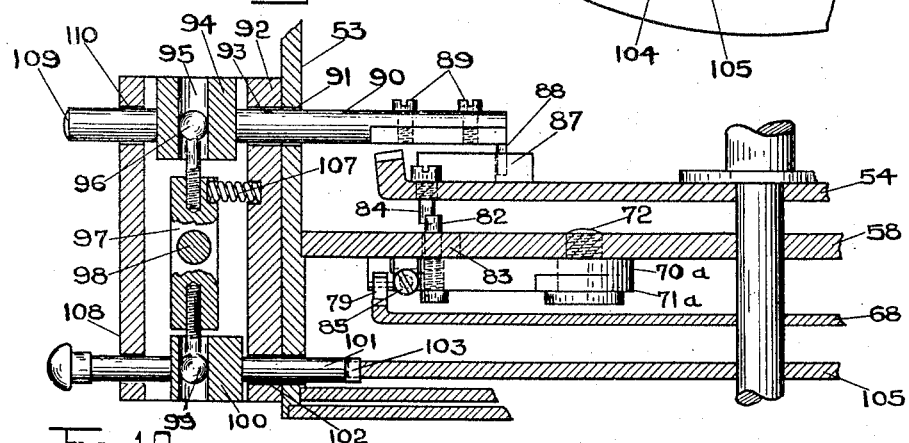
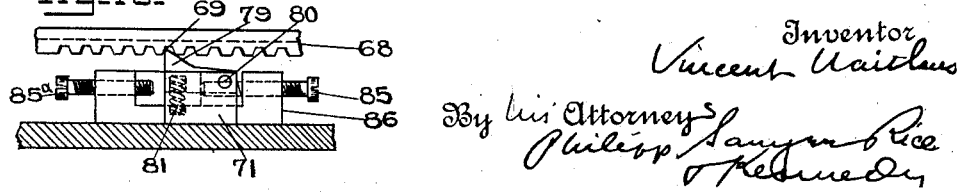

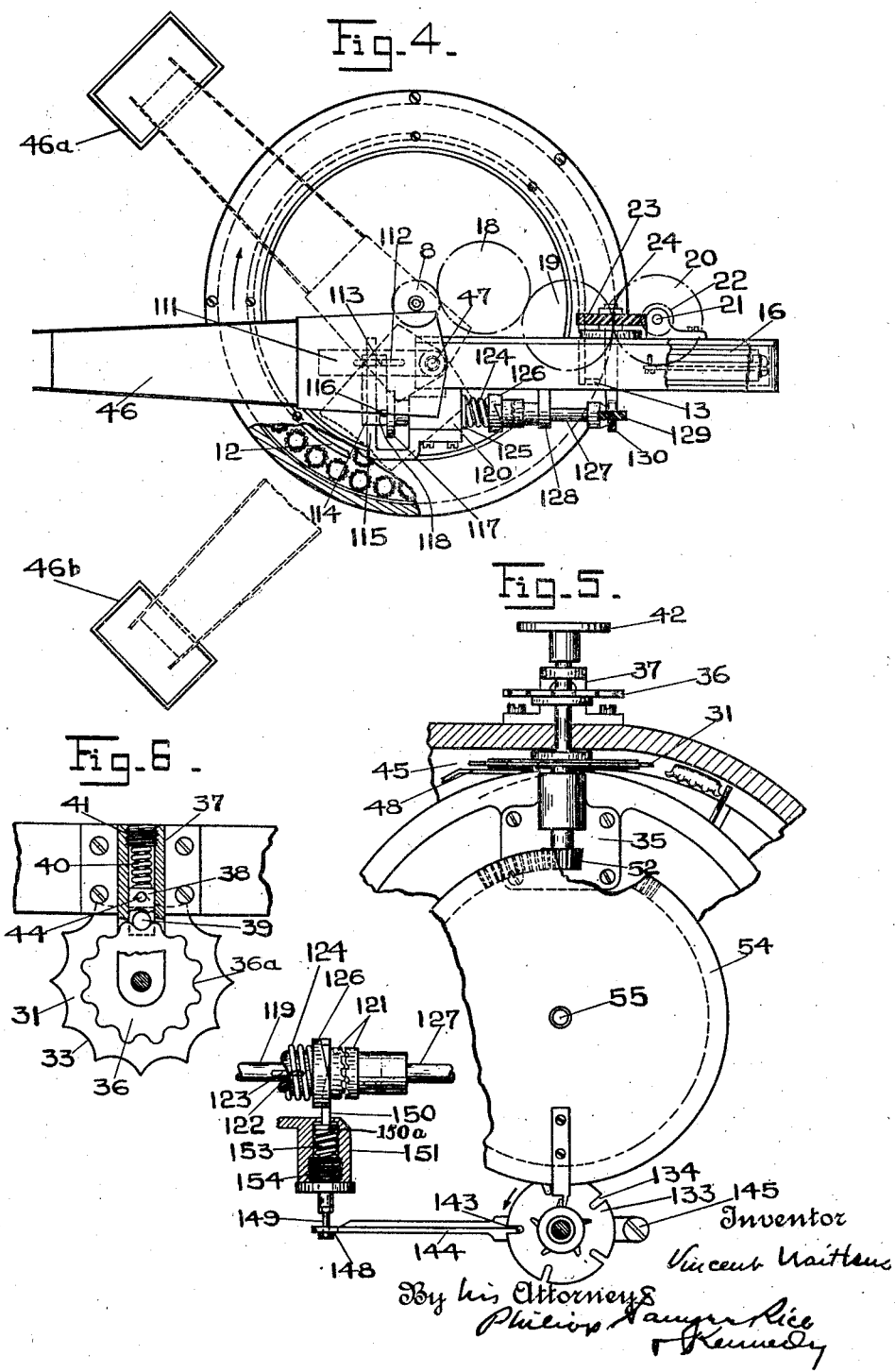

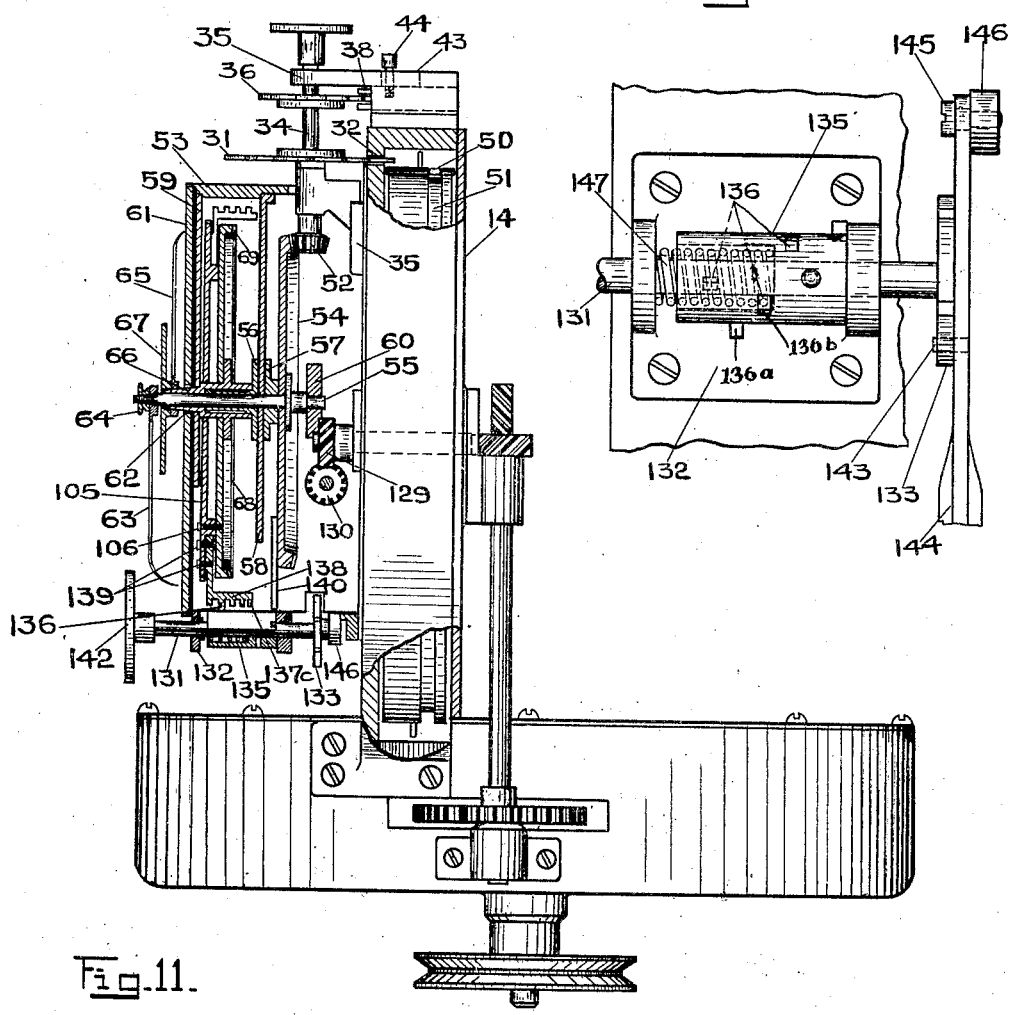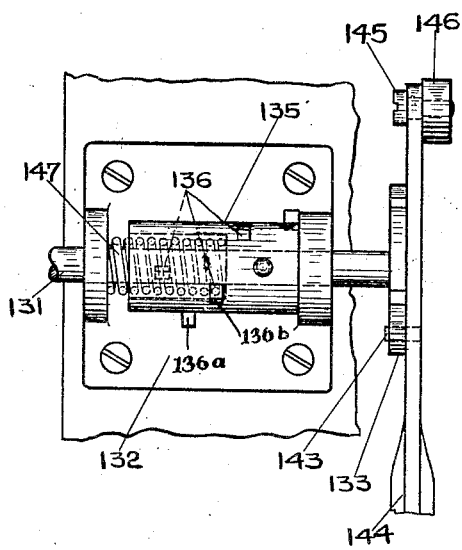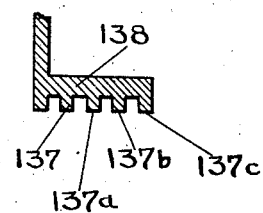

Patented Dec. 31, 1929

1,741,387

UNITED STATES PATENT OFFICE

VINCENT WAITKUS, OF BALTIMORE, MARYLAND, ASSIGNOR, BY MESNE ASSIGNMENTS, TO CROWN CORK & SEAL COMPANY, INC., OF NEW YORK, N. Y., A CORPORATION OF NEW YORK

COUNTING MECHANISM

Application filed July 21, 1927. Serial No. 207,371.

This invention relates to a counting mechanism and more particularly to a counting mechanism in which the articles counted may be delivered in lots containing predetermined amounts.

While the invention is applicable to various articles, it is here illustrated in connection with bottle caps of the well-known crown cork type. Consequently, the articles to be counted are, for convenience of description, referred to herein as crowns. In packaging crowns, it has heretofore been a common practice to count a certain desired quantity into a receptacle by hand or otherwise and then place this receptacle on one side of a balancing scale. Successive receptacles to be filled with like quantities are then placed on the other side of the scale and filled with crowns until a balance is effected, whereupon they are considered to contain the desired quantity. This method is inaccurate and unsatisfactory and results in loss of time and labor.

It is an object of the present invention to provide an apparatus for accurately and automatically counting articles such as crowns.

It is a further object of the invention to provide such an apparatus that arranges the crowns, for counting, from an indiscriminate mass.

It is still a further object of the invention to provide a counting mechanism such that the successive receptacles may be filled with predetermined numbers of crowns without stopping the operation of the apparatus.

With these general objects, and others, in view, the invention consists in the features, combinations, details of construction, and arrangements of parts which will first be described in connection with the accompanying drawings and then more particularly pointed out.

In the drawings:

Figure 1 is a view in front elevation, with parts broken away, and in section, of a counting mechanism constructed in accordance with the invention;

Figure 2 is an enlarged detail view, partly in front elevation and with parts cut away and in section;

Figure 3 is a sectional view taken on the broken line 3—3 of Fig. 2;

Figure 4 is a top plan view (reduced);

Figure 5 is a fragmentary view partly in front elevation and partly in vertical section;

Figure 6 is a detail view showing part of Fig. 5 in horizontal section;

Figure 7 is a view in side elevation with parts in vertical section;

Figure 8 is a detail bottom plan view of parts shown in Figs. 5 and 7;

Figure 9 is a fragmentary top plan view, with parts in section, of part of Fig. 3;

Figure 10 is a detail view of parts of Fig. 2; and

Figure 11 is an enlarged detail view of part of Fig. 7.

Referring to the drawings, there is provided means for arranging an indiscriminate mass of crowns in a single row flatwise, and this may conveniently be accomplished by the use of centrifugal force. Although capable of various constructions, in that here illustrated as an example, mounted on a base 1 is an arranging hopper 2 having a top opening 3 in its cover plate 4. Crowns to be counted are dumped indiscriminately into the hopper through this top opening and fall onto a rapidly rotating horizontal plate or spreader 11. This spreader may be rotated in any suitable manner. As shown, it is mounted on a shaft 6 journalled in a bearing and driven by a power pulley 9.

There is provided a channel of single row capacity, into and around which the crowns are moved due to the rotation of spreader plate 11. To this end, as here shown, concentric with the outer wall of hopper 2, and just above the plate, is a rib 12, spaced from the wall by a distance slightly greater than crown diameter. This rib forms, with the wall, a channel 5 in which crowns can be accommodated only in a single row. The top of the channel is formed by a cover plate 4 on the hopper, and the rotating plate itself forms the bottom of the channel. Plate 11 and cover plate 4 are spaced a distance slightly greater than the thickness, i. e., height, of a crown so that crowns can enter the channel only when flat and singly. That is, entrance of superposed crowns is prevented.

The rib 12 extends only part way around the hopper so as to leave a mouth (Fig. 4) for the reception of the crowns. As the plate 11 rotates, the crowns are spread or thrown outwardly by centrifugal force and at the same time carried around with the plate. Entering the mouth above referred to, the crowns are arranged in a single flat row in the channel and are carried around the channel, in the direction of the arrow in Fig. 4, by the plate. At the far end, the arcuate channel merges into a short tangent and terminates at a deflector or stop 13.

As later described, the counter is located at a point above the hopper and there is provided means for carrying the arranged crowns upwardly from channel 5 and presenting them singly to the counter. In the embodiment here illustrated as an example, contained in a housing 14, secured by screws 15 to hopper 2, adjacent deflector 13, is a vertical wheel 16 rotatable in a plane perpendicular to and cutting the plane of the plate 11. Wheel 16 is rotated, as here shown, from shaft 6 by a suitable gear train 8, 18, 19 and 20, shaft 21, beveled gears 22, 23, and shaft 24 on which wheel 16 is mounted. The speed at which wheel 16 rotates may be varied to bear any desired ratio to the speed at which crowns are deposited in the hopper by changing the gear ratios.

Extending from the bottom to the top of wheel 16 is an arcuate channel 16ª formed by the edge of wheel 16 and the peripheral and side walls of housing 14. This channel is dimensioned to receive crowns flatwise only and in a single row. At the bottom, channel 16ª communicates with channel 5 (Figs. 1 and 4), at the point where deflector stop 13 terminates the latter, whereby crowns can pass directly from one channel to the other.

To transfer the crowns and carry them upwardly around channel 16ª, the wheel 16, in the present embodiment, carries a number of radial, flexible sweeper rods 26 having their ends extending into and across channel 16ª. These rods are set into slots 25 in the face of the wheel by pins 27. Slots 25 are considerably wider than rods 26 and the latter are held away from the trailing walls of their slots by studs 28. With the construction described, the rods can give and flex sufficiently, in case of undue resistance, to pass around a crown, whereby jamming and crushing is avoided.

As wheel 16 rotates, the ends of rods 26 wipe the crowns, at the end of channel 5, from plate 11, into channel 16ª and sweep them upwardly around the latter to the top of the housing.

Additional means is provided for preventing crushing of the crowns adjacent the point where their direction of movement is changed. To this end, as here shown as an example, there is attached to the crown-approach side of housing 14, a feather spring 29 having on its inner side a rib 30. This rib 30 prevents the skirt of the crown from coming into contact with the feather spring 29. If a crown should tend to stick while being moved, it would be forced over toward the feather spring which would give way, permitting rod 26 to pass around the crown more easily.

While the counting means may vary, structures embodying the invention to the best advantage will include an element given a predetermined actuation or displacement by each crown as it passes a given point in its path around channel 16ª. In the embodiment here illustrated as an example, adjacent the top of housing 14 is a counter wheel in the form of a scalloped wheel 31 having a predetermined number of equally spaced pockets 33 (Fig. 6) of a size to embrace a crown. The wheel 31 lies in a plane substantially perpendicular to the top of wheel 16 and projects into channel 16ª, through a slot 32 (Fig. 7), to such an extent that a crown carried up the channel moves into the embrace of a pocket 33 and can pass on only by displacing or actuating wheel 31. Consequently, for every crown passing the counting point, counter wheel 31 is given an angular movement sufficient to advance the counter wheel the distance of one pocket. To prevent overthrow of the counter wheel and limit its angular movement to this measured step, stop means is provided. Although capable of various constructions, in that here shown as an example, wheel 31 is mounted on a spindle 34 journaled in a bracket 35. Also mounted on this spindle is a stopping or control disk 36 having a series of notches or depressions 36ª equal in number to the pockets 33 of the counting wheel. Riding on the periphery of disk 36 is a roller 39 mounted in the forked end of a plunger 38 and adapted to fit the notches 36ª. Plunger 38 is slidable in a cylindrical casing 37 and is urged forward by a spring 40 backed by an adjusting screw plug 41 in the rear of casing 37.

The force of a crown tending to rotate counting wheel 31 overcomes the force of spring 40 and plunger 38 is forced back as wheel and disk are stepped forward. But as the next notch of the stopping disk moves into a position opposite roller 39, the plunger is advanced again by its spring and roller 39, seating in the notch, latches the disk, and hence the wheel, against further movement.

In order that the spindle may be rotated by hand, it is provided with a knob or hand wheel 42. To release the stop means, to facilitate hand rotation, plunger 38 may be withdrawn by a pin 44 working in a slot 43 (Fig. 7) in the top of housing 37.

As each advance of counter wheel 31 counts one crown, a complete rotation thereof denotes the passage of as many crowns as the counter wheel has pockets. Since crowns are ordinarily sold in multiples of a dozen, counter wheel 31 in the present embodiment is given 12 pockets. Consequently each complete cycle of the counter represents a dozen crowns.

There is provided means for registering the count of wheel 31. Although capable of various constructions, in that here shown as an example, at the lower end of spindle 34 is mounted a bevel gear 52 (Fig. 7) having a number of teeth equal to the counting pockets 33, so that for every advance displacement of counting wheel 31, gear 52 is advanced the distance of one tooth. Within a housing 53 and meshing with gear 52 is a similar, but larger, gear 54 having a number of teeth that is some convenient multiple of the number of teeth on gear 52. As crowns are ordinarily sold by the gross, gear 54, in the present embodiment, has 144 teeth. As gear 52 makes twelve complete revolutions in giving gear 54 one revolution, each revolution of the latter corresponds to a count of a gross of crowns.

Gear 54 is mounted on and rotates a spindle 55 journaled in a hubbed bearing element 56 secured to a diaphragm 58. The spindle is also supported by a boss 57, a rear bar 60 and a front diaphragm 59. At the front of the housing 53 is a dial 61 bearing on its face a suitable scale 61ª divided in accordance with the counting units. In this instance, scale 61ª bears 144 divisions corresponding to one revolution of spindle 55. Associated with the scale, to register the count, is a hand or pointer 63 mounted on the end of spindle 55 which extends through a central opening 62 in the dial. Pointer 63 is secured to spindle 55 by a lock nut 64. Pointer 63 and scale 61ª, therefore, register the count of individual crowns up to one gross.

There is provided also, means for registering multiples of this primary count. That is, the number of gross counted, up to a predetermined limit, is registered as well as the individual count. To this end, as here shown as an example, dial 61 bears a second scale 61ᵇ having 200 divisions, representing 200 gross. Rotating over this scale is a gross-indicating pointer or hand 65 mounted on a hollow spindle 66 and secured thereto by a locking plate 67. Hollow spindle 66 has a running fit on hubbed bearing 56 and rotates freely on spindle 55.

Hollow spindle 66 is given an angular movement corresponding to one scale division of gross-registering scale 61ᵇ, for each revolution of gear 54. To this end, as here shown as an example, connected with hollow spindle 66, to drive the same, is a ratchet wheel 68 having teeth 69 equal in number to the divisions of scale 61ᵇ. This ratchet wheel is driven by a pawl 79, held to its duty by a spring 81, and pivoted on a pin 80 located in a groove in the end of a clip 71. The latter is pivotally secured to the front side of diaphragm 58 by a stud screw 72 and its normal position is controlled by a stop screw 85 adjustably mounted in one arm of a U-shaped bracket 86. Normally engaging clip 71 from above, in edge-to-edge relation, is a companion clip 70. This latter is also pivoted on stud 72, the two clips having superimposed rabbeted extensions 70ª, 71ª through which stud 72 passes.

To hold the parts in normal or initial position, threaded into clip 70 and extending upwardly into a bracket 76, secured to diaphragm 58, is a bolt 73. Coiled around this bolt and confined between bracket 76 and a lock nut 78 on the bolt is a spring 77. The action of this spring tends to move clip 70 downward (Fig. 2) and the latter's engagement with clip 71 tends to move this clip downward against stop screw 85ª.

Clip 70 is swung on its pivot, once for each revolution of gear 54, by a pin 84 carried by the gear. This pin is arranged to engage a pin 82 mounted on the outer end of clip 70 and extending through an arcuate slot 83 in diaphragm 58 (Figs. 2 and 3). When this engagement takes place, clip 70 is swung upwardly on its pivot. To cause clip 71 to move likewise, as here shown as an example, bolt 73 passes through a slot 74 in clip 71 and extends below the same (Fig. 2). Confined between the head of bolt 73 and the lower edge of clip 71 is a coiled spring 75 which tends to hold the two clips together. Consequently, when clip 70 moves, under engagement of pins 84, 82, clip 71 follows under the force of spring 75 and by this movement pawl 79 is driven against the then engaged tooth of ratchet 68 to rotate the latter.

In order to limit the movement of clip 71 and hence the stroke of pawl 79, bracket 86 carries an adjustably mounted stop screw 85 facing stop screw 85ª and engaged by the end of clip 71 at the end of its driving stroke. Thus the ends of these stop screws form a gap in which the free end of clip 71 moves and which controls the extent of movement. By proper adjustment of stop screws 85, 85ª, the clip, and hence the pawl, may be given the predetermined stroke to rotate ratchet 68 a distance equal to one tooth. As the ratchet is advanced one step, pointer 65 is advanced one scale division on the dial, thus registering the count of one gross of crowns.

Upon further movement of pin 82, under force of pin 84, clip 70 can continue to swing on its pivot, moving away from clip 71 against the compression of springs 75, 77. Since pin 84 moves on a circle having a radius much larger than the radius of the circle in which pin 82 moves, upon continued progress of pin 84, the arcs separate sufficiently for pin 84 to wipe past pin 82 and release the same. Thereupon separated and displaced clips 70, 71 are forced together again and returned to normal position by expansion of springs 75, 77. Upon this back stroke of clip 71, pawl 79 engages the next tooth of ratchet 68 ready for the next advance stroke upon the next revolution of gear 54.

There is provided means for preventing spinning or overthrow of ratchet 68. As here illustrated as an example, secured to ratchet 68, as at 106 (Fig. 7), to move therewith is a locking wheel 105 having spaced notches 104 (Fig. 2) equal in number to the teeth of ratchet 68. Normally engaging one of the notches 104 is a tooth 103 formed on the end of a plunger 101. This plunger is slidable in the walls of a hollow guide bracket 92 secured to the housing 53, its toothed end extending through a hole in the housing wall (Fig. 3). Plunger 101 is moved by a lever 97 located within bracket 92 and pivoted on a stud 98. To connect lever 97 and plunger 101, the lever 97 carries a spherical headed screw 99, the head of which can swivel in a bore 91 formed in an enlargement 100 on plunger 101. A spring 107 normally holds the parts in such position that tooth 103 takes into a notch 104 of stop wheel 105.

While the parts are in this relation, wheel 105, and hence ratchet 68, cannot rotate. The plunger 101 is withdrawn, at the proper time, to permit an advance step of ratchet 68. To this end, as here shown as an example, at the other end of lever 97 is a second spherical headed screw 96. Its head can swivel in a bore 95 formed in an enlargement 94 on a plunger 90. This plunger also is slidable in the walls of bracket 92, its enlargement 94 being located within the bracket (Fig. 3). The plunger extends into housing 53, through a hole in the wall, and to its inner end is secured, by screws 89, a cam follower 88. This cam follower is engaged by a cam 87 (Figs. 3 and 9) mounted on the flat surface of gear 54.

For each complete revolution of gear 54, cam 87 engages follower 88 and causes plunger 90 to be drawn inwardly. This movement of plunger 90 swings lever 97 and so withdraws plunger 101 to free its tooth 103 from notched wheel 105. This permits ratchet 68 to rotate under the stroke of pawl 79. Cam 87 is so arranged that it causes withdrawal of tooth 103 at the proper time to permit pawl 79 to operate and releases follower 88 for the return of the parts, under force of spring 107, at the end of the predetermined movement of ratchet 68. Thus, plunger 101 is advanced to cause its toothed end 103 to engage the next notch 104 of wheel 105 and the ratchet is again locked.

When it is desired to re-set the registering pointers, locking plunger 101 can be withdrawn by pushing in plunger 90 by its end 109 which extends through the front wall of bracket 92 (Fig. 3).

The crowns, after leaving the counting wheel 31, are discharged from the apparatus, for example, by gravity. The invention in its entirety includes means for guiding the gravity-discharged crowns to a receptacle and means for automatically shifting the guiding means, for discharge into another receptacle, upon discharge of a predetermined number of crowns. This guiding means may have the form of a chute or spout and this spout may be movable from one position to another after a predetermined count. In the embodiment here illustrated as an example, beyond the counting wheel, channel 16ª opens into a chamber 45 (Fig. 5) which communicates with the mouth of a chute or spout 46 (Figs. 1 and 4). The top of this spout, and an arm 111 secured to the bottom of the spout, are pivoted to housing 14 by pins 47. Fig. 1, and the full lines of Fig. 4, show the spout in an intermediate position in which it may conveniently be used should the automatic shifting means be discarded. The dotted lines of Fig. 4 indicate the extreme positions into which the spout is alternately moved by the automatic shifting means. Extending downwardly from the discharge side of the counting wheel is a plate or chute 48 which extends into the mouth of spout 46, as at 49, regardless of the pivotal position of the spout. At its other end, plate 48 has a finger 50 (Fig. 7) which rides tangentially in a groove 51 formed in the periphery of wheel 16. This finger serves to lift the crowns away from the surface of the wheel 16 as they reach the counting point and so aids in their discharge. The crowns, after actuating the counter, therefore, slide down chute 48 into spout 46 and slide down the spout to be discharged into a receptacle, such as a packing case 46ª, which may be placed under the spout.

The spout is, as here shown, swung from one extreme position to the other by a pin 113 riding in a slot 112 in pivot arm 111. This pin is fastened to the top of a slide 114 which is freely movable back and forth on a bracket 115 by which it is supported. The slide is moved by a pin 116 eccentrically mounted on the face of a disk 117 and adapted to work back and forth in a groove 118 formed in the side of the slide as the disk is rotated. The parts are so arranged that one half a revolution of disk 117 gives slide 114 the necessary stroke to swing the spout from one extreme position to the other. During the second half of the revolution of the disk, slide 114 is reversed and the spout swung back to initial position.

Disk 117 is mounted on a shaft 119 rotatable in a bearing 120 and carrying one section of a two-part toothed clutch 121. This clutch section is slidably keyed to shaft 119 by means of two pins 122 riding in a keyway 123. Shaft 119 is rotated only when the clutch sections are engaged. The other section of this clutch is secured to and rotates with a shaft 127 journaled in a bearing 128 and driven by intermeshing gears 129, 130 from an extension of shaft 24. This shaft 127 and its clutch section, therefore, constitute a live part of the spout-swinging mechanism that rotates continuously while the machine is in operation. At the proper time, by means to be described, the dormant half of clutch 121 is moved into engagement with the live half to cause rotation of shaft 119 and disk 117.

There is provided means whereby the clutch is caused to be engaged, for spout movement, and thereafter disengaged at the end of half a revolution. To this end, as here shown as an example, the slidable clutch section is urged forward by a spring 124 confined between a washer 125 and the rear face of a clutch cam 126 coupled to this clutch section. Cooperating with the face of this cam is a stop pin 150. Under normal or dormant conditions, a high level on the cam is presented to the stop pin and the parts are so arranged that this engagement of cam and pin holds the cam-clutch unit back (to the left in Fig. 5) with the clutch disengaged.

The clutch is caused to be engaged by withdrawal of stop pin 150. In the present embodiment, the pin is normally held to its duty by a spring 153 confined between a collar 150ª on the pin and a screw plug 154 in the bottom of a spring housing 151. The pin is withdrawn from stopping position by a lever 144 pivoted by a stud screw 145 to a bracket 146 on housing 53. This lever has a forked end 148 which straddles an abutment screw 149 adjustably threaded into the lower end of pin 150 which extends down through plug 154. When lever 144 is swung down on its pivot, as later described, its forked end engages the head of screw 149 and pulls down pin 150 to withdraw it from stopping position, whereupon spring 124 moves the slidable clutch section forward to engage the live clutch section. When the force exerted on lever 144 is relieved, pin 150 is returned to initial position by its spring, the head of screw 149 pulling lever 144 back to normal position. As later described, after lever 144 is actuated it is at once released so that pin 150 may at once be returned. Meanwhile, however, cam 126 has started to rotate due to the clutch engagement. Beyond the high level on the cam is a low or neutral point reached by a sudden drop. By the time pin 150 has been returned to initial position, cam 126 has rotated far enough to present this neutral point to the pin. Consequently, pin 150, in this position of the cam, does not interfere with the clutch. Beyond the neutral point, however, the cam face has a gradual rise to a second high point. As the cam rotates, therefore, pin 150 rides up this incline and gradually cams the slidable clutch unit back against its spring. The cam is so designed that it presents the high level to pin 150 to effect complete disengagement of the clutch at the end of half a revolution of shaft 119. The latter then remains dormant until lever 144 again withdraws pin 150.

Cam 126 is so formed that the sudden drop to neutral, the gradual rise and the high level are duplicated for each 180° of the cam's circumference. At the next withdrawal of pin 150 by lever 144, therefore, the cycle just described is duplicated for the second half of cam 126 to give shaft 119 a second half revolution. In this case, however, while disk 117 makes its second half revolution, slide 114 is given a reverse stroke and the spout is swung back to initial position, as before described.

Means is provided for actuating lever 144 at the end of predetermined counts and the actuating parts may be set or adjusted so that actuation may take place at the end of any of various different totals. Since the actuation depends, in the present embodiment, on the rotation of the gross-registering unit, the largest predetermined count corresponds to a complete revolution of ratchet 68. In the present instance, this ratchet has 200 teeth. Consequently, the largest possible count for one position of the spout is 200 gross. The spout may be moved, however, at the end of any smaller count. In the present embodiment, provision is made for moving the spout following counts of 1, 25, 50, 100 or 200 gross.

To actuate lever 144, as here shown, the lever has a pin 143 embraced by one of a number of notches 134 formed in the periphery of a disk 133. This disk is mounted on a spindle 131 (Fig. 7) journaled in a bearing bracket 132. When spindle 131 is rotated, the consequent movement of disk 133 actuates lever 144 through the notch and pin connection. As later described, the particular notch of disk 133 which takes over pin 143 depends on the particular count provided for, but the actuation of lever 144 is the same in all cases.

Considering, first, actuation at the end of a count of 25 gross, spindle 131 is rotated by engagement of cooperating elements on the spindle and gross-registering unit respectively. To this end, pinned to spindle 131 is a drum 135 having on its surface a lug 136. The gross-registering unit carries actuating elements spaced in accordance with the quantity to be packaged. For 25 gross lots, since one revolution corresponds to 200 gross, the registering unit is provided with eight actuating elements equally and accurately spaced 45° apart on the unit. In the present embodiment secured to stop wheel 105 (which moves as a unit with ratchet 68) are eight shoes 138 (Figs. 7 and 11) spaced 45° apart and each carrying an actuating finger 137. The parts are so arranged that these eight fingers lie in a circle parallel to wheel 105, the plane of which includes lug 136. Consequently, as the registering unit is stepped ahead, each successive finger 137 engages lug 136 and by this engagement causes the angular movement of spindle 131 necessary to actuate lever 144, whereby pin 150 is withdrawn to cause swinging of the spout. The parts are so arranged that this rotary movement of spindle 131 is only slight and fingers 137 quickly wipe past lug 136. As soon as a finger is free of the lug the force exerted on lever 144 is released and the lever can return to initial position due to spring 153, as above described. By this return movement of the lever, disk 133 and hence spindle 131 and drum 135, are returned to initial position ready for the next actuating finger.

Thus lever 144 is actuated to cause swinging of the chute for each eighth of a revolution of the gross-registering unit, in other words, at the end of each 25 gross of discharged crowns.

It will be understood that after the spout has discharged its quota to one receptacle and moved away, an attendant may remove the filled receptacle and substitute an empty ready for the return movement of the spout. Thus crowns may be delivered to successive packaging receptacles, in counted lots, without stopping the counting mechanism.

For packaging other lots than 25 gross, either the actuating fingers 137 or the lug 136 must be rendered inactive. In the present embodiment, drum 135 is rotated to move lug 136 out of the reach of fingers 137. To this end, spindle 131 carries a knob or finger-piece 142 by which spindle 131 may be drawn forward (to the left in Fig. 7), thus freeing disk 133 from engagement with pin 143, and then rotated to move lug 136 into an inactive position. At the same time, the parts are set for some other sized lot. Drum 135 carries a number of lugs 136$^a$, 136$^b$ etc. (Fig. 8), like lug 136 but offset from each other both circumferentially and axially on the drum. The lugs are spaced circumferentially by angular distances equal to the angular spacing of notches 134 in disk 133. Only one lug can be in active position at any one time and the particular lug that is active depends on which notch 134 is in engagement with lever pin 143. In other words, disk 133 not only serves as part of the lever-actuating mechanism but also as a selective element to determine the unit count for one spout position. Selective adjustment is made by drawing spindle 131 forward to free disk 133 from pin 143, turning the spindle to bring the notch 134 corresponding to the desired drum lug in line with pin 143, and moving spindle 131 back to normal axial position with such notch taking over pin 143. The spindle is retained in normal axial position by a spring 147. Finger-piece 142 may bear indicia for showing the proper angular position of spindle 131 for the various counts.

For counts of 50 gross, spindle 131 is adjusted to engage the proper notch of disk 133 to place lug 136$^a$ in active position, i. e. uppermost on the drum. To cooperate with lug 136$^a$, the gross-registering unit carries four actuating elements spaced 90° apart. As here shown, alternate shoes 138 are provided with actuating fingers 137$^a$, spaced from fingers 137 and lying in a plane passing through lug 136$^a$. Consequently, as the gross-registering unit is stepped ahead, a finger 137$^a$ engages lug 136$^a$ to rotate drum 135 and actuate lever 144 as above described, for every quarter revolution. Thus, the spout is swung at the end of every 50 gross.

For lots of 100 gross, two of the shoes 138 spaced 180° apart have actuating fingers 137$^b$. These fingers are spaced from fingers 137$^a$ and lie in a plane passing through the corresponding lug on drum 135. The spindle unit having been set with this lug in active position, the drum is rotated, and lever 144 actuated, as the gross-registering unit is stepped forward, twice for each revolution of the latter. Thus, the spout is moved at the end of each 100 gross.

For lots of 200 gross, one only of the shoes 138 has an actuating finger 137$^c$. This is spaced from finger 137$^b$ and lies in a plane passing through the corresponding lug on drum 135. The spindle unit having been set with this lug in active position, the drum is rotated and lever 144 actuated, as the gross-registering unit is stepped forward, once for each revolution of the latter. Thus, the spout is swung at the end of each 200 gross.

For single gross lots, actuation is effected directly from unit-registering gear 54, since it would be inconvenient to provide wheel 105 with 200 actuating elements. To this end, mounted on gear 54 is an actuating finger 140 lying in a plane including the corresponding lug on drum 135. The spindle unit having been set to place this lug in active position, the drum is rotated and lever 144 actuated once for each revolution of gear 54. Thus, the spout is swung at the end of each gross.

It is believed that the operation of the apparatus will be clear from the above without further description.

What is claimed is:

1. In a counting mechanism, and in combination, a counter, means for presenting articles to said counter, means whereby the counted articles are conducted away from said counter along a given path, and means operated automatically upon the completion of a predetermined count whereby the conducting means conducts the conducted articles away from the counter along a different path.

2. In a counting mechanism, and in combination, a counter, means for guiding counted articles away from the counter for delivery to a receptacle, and means operated automatically upon the completion of a predetermined count for shifting said guiding means whereby the articles may thereafter be guided to a different receptacle.

3. In a counting mechanism, and in combination, a counter, means for presenting the articles to the counter, means for guiding the counted articles away from the counter for delivery to a receptacle, means operated automatically upon completion of a predetermined count for shifting said guiding means whereby the articles may thereafter be guided for delivery to a different receptacle, said last named means having means for effecting a regulation of the predetermined count.

4. In a counting mechanism, and in combination, a counter, means for presenting the articles to the counter, means for guiding the counted articles away from the counter for delivery to a receptacle, means including a shaft for shifting said guiding means, a drive shaft for driving said shifting shaft, a clutch connection between said shafts, means for normally holding said clutch connection in inactive position, and means dependent on said counter for releasing said holding means.

5. In a counting mechanism, and in combination, a counter mechanism, means for presenting the articles to the counter, means for guiding the counted articles away from the counter, means including a shaft whereby the guiding means is shifted upon a half revolution of said shaft, and means controlled by said counter for causing a half turn only of said shaft upon a predetermined count, said last named means being adjustable to effect operation of said shaft upon various counts.

6. In a counting mechanism, and in combination, a counter, means for presenting the articles to said counter, guiding means for guiding the articles away from said counter, means including a driven shaft for causing a shift of said guiding means upon a half revolution of said shaft, a drive shaft, clutch elements on said shafts, one of said clutch elements being slidable on its shaft, a spring tending to engage said clutch elements, means including a collar and stop pin for normally holding said slidable clutch element in inactive position, means controlled by said counter for operating said stop pin to release said sliding clutch element, and a cam surface on said collar for camming the slidable clutch element out of engagement with the complementary clutch element upon half a revolution thereof.

7. In a counting mechanism, and in combination, a counter, means for presenting the articles to said counter, guiding means for guiding the articles away from said counter, a plurality of sets of lugs on a rotating part of said counter, those of one set being offset from those of the other set, an angularly adjustable drum, a plurality of lugs so arranged on said drum that one lug is in the plane of one of the sets of counter lugs, depending on the angular position of the drum, and so arranged that the drum is moved on its axis by the engagement of a counter lug with a drum lug, and means controlled by such movement of the drum for causing a shift of said guiding means.

In testimony whereof, I have hereunto set my hand.

VINCENT WAITKUS.